United States Patent [19]

Wenzel et al.

[11] 4,123,423
[45] Oct. 31, 1978

[54] PROCESS FOR THE MANUFACTURE OF PLASTICS CONTAINING ESTER AND/OR URETHANE GROUPS

[75] Inventors: Wolfgang Wenzel; Dieter Dieterich, both of Leverkusen, Germany

[73] Assignee: Bayer Aktiengesellschaft, Leverkusen, Germany

[21] Appl. No.: 832,778

[22] Filed: Sep. 13, 1977

[30] Foreign Application Priority Data

Sep. 18, 1976 [DE] Fed. Rep. of Germany ....... 2642073

[51] Int. Cl.$^2$ ............................................. C08G 18/00
[52] U.S. Cl. .............................. 528/71; 260/29.2 TN; 260/29.2 UA; 260/29.2 E; 528/49; 528/79 UA; 528/52; 528/75; 528/73; 528/304
[58] Field of Search ............... 260/29.2 TN, 29.2 UA, 260/29.2 E, 75 R, 75 N, 75 S, 75 UA, 77.5 Q, 77.5 TB, 77.5 AA, 75 TN

[56] References Cited

U.S. PATENT DOCUMENTS

| | | | |
|---|---|---|---|
| B 414,266 | 2/1976 | Carlson | 260/29.2 TN |
| 3,686,108 | 8/1972 | Reiff et al. | 260/29.2 TN |
| 3,756,992 | 9/1973 | Dieterich | 260/858 |
| 3,905,929 | 9/1975 | Noll | 260/859 R |
| 3,993,614 | 11/1976 | Carlson | 260/29.2 TN |
| 4,016,120 | 4/1977 | Matsuda et al. | 260/29.2 TN |

OTHER PUBLICATIONS

Ullmans Encyclopedia of Technical Chemistry, Urban & Schwarzenberg, Munich–Berlin, vol. 14, pp. 99–103, 1963.

Primary Examiner—M. J. Welsh
Attorney, Agent, or Firm—Gene Harsh; Lawrence S. Pope

[57] ABSTRACT

The present invention is concerned with a process for preparing aqueous dispersions from solid polymer precursors which are polyester or polyurethane oligomers containing both hydrophilic centers and cross-linking sites and subsequently coating substrates with the thus obtained dispersions. The aqueous dispersion is applied to a substrate and dried with resultant cross-linking of the film.

12 Claims, No Drawings

PROCESS FOR THE MANUFACTURE OF PLASTICS CONTAINING ESTER AND/OR URETHANE GROUPS

FIELD OF THE INVENTION

This invention relates to a new process for the manufacture of plastics by way of the intermediate stage of aqueous dispersions of oligomeric plastics precursors containing hydrophilic groups which render them dispersible in water and groups which are reactive under the influence of atmospheric oxygen and/or heat, production of this dispersed intermediate being followed by its conversion into cross-linked high molecular weight sheets.

BACKGROUND OF THE INVENTION

Processes for the preparation of stable, aqueous plastics dispersions, for example, polyurethane polyurea dispersions, are already known, e.g., German Pat. Nos. 1,182,946 and 1,178,586; German Auslegeschrift No. 1,237,306; German Offenlegungsschriften No. 1,495,745; 1,595,602; 1,770,068; 2,019,324 and 2,314,512; U.S. Pat. Nos. 3,756,992; 3,686,108 and 3,905,929 and D. Dieterich et al, Angew. Chem. 82, 53 (1970). The dispersions described in these references are based on the principle of introducing hydrophilic centers into a macromolecular chain of a polyurethane (polyurea) molecule. In the known dispersions, these hydrophilic centers or so-called internal emulsifiers are ionic groups or ether functions. They are either built into the prepolymer in the form of special diols or used as modified amines for chain lengthening the prepolymers which invariably have at least two isocyanate end groups.

Various processes are available for preparing the known dispersions and have been described, for example, in D. Dieterich and H. Reiff, Angew. Makromol. Chemie 26, 85 (1972). As a general rule, the solution of a polyurethane in an organic solvent is either converted into an aqueous dispersion or a prepolymer in the form of a liquid is dispersed in water, with or without solvent. For example, a liquid prepolymer ionomer containing isocyanate groups may be introduced into water with vigorous stirring; an emulsion of the prepolymer is initially formed, which then continues to react with water or a diamine or polyamine to undergo chain lengthening to a high molecular weight polyurethane urea.

One particularly simple method of dispersion has been described in German Offenlegungsschrift No. 1,913,271 or U.S. Pat. No. 3,756,992. According to this method, a solid or liquid polyurethane polyelectrolyte which is capable of undergoing addition with formaldehyde to form methylol groups is dispersed by mixing with water and converted into a polyurethane polyelectrolyte containing methylol groups by addition of formaldehyde or formaldehyde derivatives. This polyurethane polyelectrolyte is then condensed to the high molecular weight polyurethane either in the dispersion or on a substrate.

To effect dispersion, water is added to the stirrable melt until it forms the continuous phase, the system in most cases first passing through the water-in-oil emulsion stage. Alternatively, a water-in-oil emulsion may be prepared at an elevated temperature, this emulsion then changing into an oil-in-water emulsion on cooling. Preparation of the dispersion is practically always carried out at elevated temperatures, preferably at between 50° C. and 120° C. This is necessary, first because the prepolymer stage which is to be dispersed is too highly viscous at room temperature and would, therefore, require elaborate apparatus such as screw extruders for dispersion at that temperature, and second because the rate at which dispersion takes place generally increases with the temperature employed. Dispersion of solvent-free melts of isocyanate prepolymers is also almost always carried out at elevated temperatures.

Although the procedure described above is economically very advantageous compared with the preparation of dispersions from solutions and can be carried out with simple apparatus, it is not satisfactory for all practical requirements. Non-ionic dispersions are very difficult or even impossible to prepare by this method because the dispersability of polyurethane precursors which contain hydrophilic polyether groups diminishes with increasing temperature. This means that for dispersion at the elevated temperatures required, it is necessary to increase the hydrophilic character of the compound to a greater extent than is necessary for the subsequent stability of the dispersion. The water resistance of the product is thereby reduced. On the other hand, the preparation of polyurethanes which have been modified with hydrophilic ether groups would be particularly desirable because dispersions of these polyurethanes have a high resistance to frost.

The usual ionomer dispersions generally have insufficient resistance to frost, so that storage and transport during the cold season of the year are expensive because they require heated storage rooms. Moreover, the transport of aqueous dispersions over long distances is in itself unsatisfactory because of the added expense of transporting large quantities of water.

There is, therefore, a demand for the processer to be able to prepare his own dispersions from the solid materials and water in much the same way that organic solutions are generally prepared.

One step in this direction is the supply of redispersible powders, which are already known. The manufacture of these powders is technically complicated and undesirable on economic grounds because the powders are prepared from a previously prepared dispersion by an expensive freeze drying or spray drying process, as described in German Auslegeschrift No. 1,729,201. It would, therefore, be desirable to have available a process for the production of a solid material which is stable in storage and which could be converted into an aqueous dispersion at a later date without the complicated intermediate stage of an aqueous primary dispersion.

In that way, the full economic advantage would be gained from applying polymers from the aqueous phase.

The solution to this problem has generally been regarded as basically impossible because dispersions, being metastable diphasic systems, cannot be obtained spontaneously by a process of solution but, on the contrary, tend to deposit solids irreversibly under the influence of chemical or physical changes, which is the reason why stabilization of the dispersions plays a very important commercial role. It is well known to the man of the art that coatings which have been deposited from dispersions cannot be reconverted into the dispersions by the action of water. The commercial applications of dispersions, in fact, depend on the impossibility of direct redispersion. Very hydrophilic dispersion coatings are exceptions to this rule, but, in view of their lack of resistance to water, they are of no commercial importance.

SUMMARY OF THE INVENTION

It has now surprisingly been found that certain solid polymer precursors spontaneously change into stable dispersions on contact with water below their softening range. This means that they can be, so to speak, dissolved to form dispersions by introducing them into water in the form of solid lumps or coarse powder or by pouring water over them. Certain reactive centers to be described in more detail below can be built into these polymer precursors so that the sheets obtained from the dispersion can be cross-linked by the action of atmospheric oxygen and/or heat without the addition of external cross-linking agents. High quality films and coatings which are completely water-resistant can thereby be obtained.

The present invention relates to a process for the preparation of plastics containing ester and/or urethane groups on the basis of oligomeric precursors containing ester and/or urethane groups which are capable of being cross-linked by air and/or heat without the addition of external cross-linking agents, characterized in that polymer precursors which contain ester and/or urethane groups and a) have an average molecular weight of less than about 20,000, b) have a softening point of at least 40° C., c) contain from about 4 to 180 milliequivalents per 100 g of ionic groups or groups capable of conversion into ionic groups and/or from about 2 to 20% by weight of ethylene oxide units of the formula

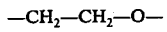
$$-CH_2-CH_2-O-$$

within a polyether chain, and d) have olefinic double bonds which are reactive with atmospheric oxygen and/or sulphhydryl groups and/or blocked isocyanate groups which form free isocyanate groups under the action of heat are introduced into water in the form of solid lumps or a coarse powder or have water poured over them at a temperature below their softening range, any groups contained therein which are capable of conversion into ionic groups being optionally converted at least partly into ionic groups in known manner either before, during or after contact of the polymer precursor with water, and in that the stable dispersion spontaneously formed by this contact with water is applied to a substrate and dried, cross-linking of the sheet finally obtained being ensured, if desired, by the addition of siccatives before, during or after application of the dispersion or by the action of heat after its application.

The present invention also relates to the oligomeric precursors containing urethane groups which besides the precursors containing ester groups are used in the process of the invention.

DETAILED DESCRIPTION OF THE INVENTION

Drying of the dispersion is preferably carried out at temperatures of between about 20° C. and 180° C. As can be seen from the description given above, the ionic groups which may be present in the polymer precursors may also be formed by introducing into the polymer precursors appropriate groups which are capable of conversion into ionic groups, i.e., in particular tertiary amino groups, carboxyl groups or sulphonic acid groups, which are then at least partially converted into the ionic groups by quaternization (of tertiary amino groups) or preferably neutralization before, during or after, preferably during, the bringing together of the precursor with water. Thus, for example, a preliminary product containing tertiary amino groups, carboxyl groups or sulphonic acid groups could first be synthesized, and the potential ionic groups could then be converted into ionic groups by the appropriate reaction in the absence of water and the product could then be brought into contact with water. Alternatively, the precursor containing the above-mentioned potential ionic groups could first be brought into contact with water and only later reacted with the appropriate neutralizing agent. However, conversion of the potential ionic groups into ionic groups is preferably carried out during dispersion process by using water or an aqueous solution at a pH below 6, i.e., an aqueous acid, for dispersing a basic polymer precursor and an aqueous solution, i.e., an aqueous base having a pH above 8 for dispersing a precursor which contains acid groups.

The polymer precursors containing ester groups and no urethane groups used in the process according to the invention are in part already known. Both types of precursors used in the process of the invention namely those which contain ester groups as well as those which contain urethane groups and optionally ester groups include the usual polycondensates or polyaddition products containing ester and/or urethane groups, in particular polyesters, polyester-urethanes, polyurethanes or polyurethane ureas selected from the starting components normally used for the synthesis of these plastics. The only condition to be observed is that the calculated molecular weight of the polymer precursors should be below about 20,000 and preferably between about 700 and 10,000. This means that an equivalent ratio of isocyanate groups to active hydrogen atoms of less than 1 and preferably less than about 0.9 is employed for preparing polyester urethanes, polyurethanes or polyurethane ureas or that monofunctional starting materials (monohydric alcohols, monofunctional isocyanate blocking agents and/or monoisocyanates) are included in the reaction mixture to ensure chain breaking before the critical molecular weight limit indicated above is reached. When preparing polyesters free from urethane groups, which are also suitable for the process according to the invention, the aforesaid limitation in the molecular weight means that the quantitative proportions and functionality of the starting materials must be suitably chosen to prevent the aforesaid molecular weight being exceeded or the condensation reaction must be stopped before the critical molecular weight limit is reached. Furthermore, the polymer precursors used in the process according to the invention should be solid at room temperature, i.e., they should have a softening range above about 40° C. The softening ranges of the polymer precursors can be determined by, for example, the method of differential thermoanalysis (DTA) (R. Bonart, L. Morbitzer and H. Rinke, Kolloid-Z. u. Z Polymere 240, 807 (1970); H. U. Herwieg, ibid 211, 34 (1966).

The polymer precursors must be able to be broken apart at room temperatures so that they can be used in the form of lumps or powders. Furthermore, they must contain from about 4 to 180 milliequivalents per 100 g of ionic groups or groups capable of conversion into ionic groups and/or about 2 to 20% by weight of ethylene oxide units of the formula $CH_2$-$CH_2$-O built into the polyether chain. The precursors could conceivably contain more than 180 milliequivalents per 100 g of groups capable of conversion into ionic groups, but in that case only a part thereof would be neutralized so that the dispersed polymer precursor finally obtained would contain a maximum of about 180 milliequivalents per 100 g of ionic groups. It is an important condition for the dispersibility of the prepolymers to ensure that they contain from about 4 to 180 milliequivalents per 100 g of ionic groups and/or about 2 to 20% by weight of ethylene oxide units. If, therefore, precursors which contain no ethylene oxide units and only potential ionic groups are first prepared, these potential ionic groups must be converted into ionic groups, as already explained above. However, it would also be conceivable, for example, to prepare a polymer precursor containing potential ionic groups, e.g., tertiary amino groups and ethylene oxide units, which would already be dispersible without the tertiary amino groups being first converted into the corresponding ammonium groups provided that the proportion of ethylene oxide units is within the range indicated above. Conversion of the potential ionic groups into ionic groups is, therefore, only essential if no other groups which ensure dispersibility are present. It is disadvantageous to combine a maximum quantity of ionic groups with a maximum quantity of ethylene oxide groups because the hydrophilic character of the substance produced would be too high for most purposes. The polymer precursors to be used in the process according to the invention are, therefore, of the kind in which the hydrophilic groups consist exclusively of ionic groups or ionic groups and ethylene oxide units or exclusively ethylene oxide units. The first two of these three variations are preferred. The prepolymers with urethane groups which are particularly advantageous for the process according to the invention have from about 4 to 50 milliequivalents per 100 g of (potential) ionic groups and from about 0 to 17% by weight of ethylene oxide units $CH_2$-$CH_2$-O. The prepolymers which do not contain urethane groups which are particularly preferred for the process according to the invention have from about 20 to 150 milliequivalents per 100 g of (potential) ionic groups and no ethylene oxide units.

The polymer precursors to be used in the process according to the invention also contain reactive centers which make it possible for them to be cross-linked by the action of atmospheric oxygen and/or heat. These reactive centers are olefinic double bonds, sulphhydryl groups or blocked isocyanate groups or any combination of the three, provided that at least one type of the above-mentioned reactive centers is present. The statistical average of the number of reactive centers should be from about 0.2 to 3, preferably about 0.5 to 1.5 per 1,000 molecular weight units of the polymer precursor and at least two such reactive centers per molecule of the polymer precursor or, in the case of olefinic double bonds, at least one reactive center. If the substance is to be cross-linked by heat by way of blocked isocyanate groups, the molecule of the precursor must, of course, in addition contain groups which are capable of undergoing an addition reaction with isocyanate groups, for example, hydroxyl, carboxyl, urethane or urea groups. If the substance is to be cross-linked by oxidation by way of olefinic double bonds, it is advisable to add siccatives, e.g., cobalt, manganese or lead salts of linoleic, resinic or naphthenic acid, in quantities of from about 0.05 to 5.0% by weight, based on the solid weight of polymer precursor. These siccatives are preferably added to the aqueous dispersion of the precursor before it is applied.

Preparation of the polymer precursor is otherwise carried out by the known methods of preparing polyurethanes, polyureas and polyesters from the usual starting components.

Polyesters suitable as polymer precursors according to the invention are prepared by the condensation of polyhydroxyl compounds with polycarboxylic acids or polycarboxylic acid anhydrides or by transesterification reactions of the kind known in the chemistry of alkyd resins, for example, as described in Houben-Weyl "Methoden der organischen Chemie", Georg Thieme Verlag Stuttgart (1963), Volume 14/2, pages 30 et seq or in Ullmanns Enzyklopadie der technischen Chemie (Urban and Schwarzenberg Munich/Berlin) (1963) Volume 14, pages 99 et seq. Starting materials for the preparation of the polyesters have also been described in these literature references. The following are examples of suitable starting materials:

a) Polyhydric alcohols within a molecular weight range of 62 to 200, e.g., ethylene glycol, propane-1,2-diol, tetramethyleneglycol, butene-(2)-1,4-diol, neopentyl glycol, bis-(2-hydroxyethyl)-bisphenol A, sorbitol, trimethylolpropane monoalkyl ether, hexamethylene glycol, 1,4-dihydroxy-cyclohexane, perhydro-bisphenol A, glycerol, trimethylolethane, trimethylolpropane and pentaerythritol;

b) polycarboxylic acids within a molecular weight range of 90 to 300, e.g., oxalic acid, succinic acid, adipic acid, phthalic acid, isophthalic acid, terephthalic acid, tetrahydrophthalic acid, hexahydrophthalic acid, endomethylene tetrahydrophthalic acid, dimeric fatty acids, fumaric acid and maleic acid;

c) natural fats and oils, e.g., castor oil, linseed oil, sunflower oil, soya oil, dehydrated caster oil, ground nut oil, safflower oil and cottonseed oil.

Monovalent starting materials may also be used for the preparation of the polyesters, i.e., the following:

a) monocarboxylic acids within a molecular weight range of 30 to 300 such as formic acid, acetic acid, butryic acid, linseed oil fatty acid, benzoic acid, coconut oil fatty acid, ricinoleic acid, ricinic fatty acid, soya oil fatty acid, hexahydrobenzoic acid, toluic acid, α-ethylhexanoic acid, acrylic acid, crotonic acid and oleic acid;

b) monohydric alcohols within a molecular weight range of 32 to 200, e.g., methanol, n-octanol, stearyl alcohol, allyl alcohol, ethyl glycol, cyclohexanol and trimethylol propane diallylether. Amines such as hexamethylene diamine or 4,4'-diaminodiphenylmethane may also be used in the preparation of the polyesters to form polyester-polyamide structures.

Then polyesters are used as polymer precursors in the process according to the invention, the incorporation of olefinically unsaturated double bonds or of sulphhydryl groups is preferred to the incorporation of blocked isocyanate groups. The incorporation of sulphhydryl groups into the polyesters may be carried out, for example, by using suitable quantities of alcohols or amines which have mercapto groups, e.g., 2-mercaptoethanol, α-monothioglycerol, α,γ-dithioglycerol, α,β-dithioglycerol, 2-mercaptopropanol, 2,2-dimethylol-butyl mercaptan, 3- or 4-mercaptoaniline, 2-mercaptophenylenediamine, 2-mercapto-p-toluidine, 4-mercaptoo-toluidine, 2,6-diamino-4-mercaptotoluene or 2-mercapto-7-aminonaphthalene.

Olefinically unsaturated double bonds are incorporated by means of the unsaturated starting materials already indicated above.

Ionic groups or groups capable of conversion into ionic groups, in particular the carboxylate or carboxyl groups which are preferred in the case of polyesters, can easily be incorporated simply by stopping the condensation reaction when the polyester reaches an acid number of about 30 to 200. Sulphonic acid or sulphonate groups can be incorporated, for example, by using a diol which contains sulphonate groups or sulphonisophthalic acid.

The incorporation of ethylene oxide units arranged in a polyester chain can easily be achieved by using mono- or polyhydroxypolyethers containing ethylene oxide units, preferably within a molecular weight range of about 1,000 to 3,000 of the kind which can be obtained in known manner by the alkoxylation of suitable starter molecules in the presence of ethylene oxide, for example, monohydric or polyhydric alcohols of the kind included in the examples above. For preparing these polyethers, the ethylene oxide must, of course, be used in the form of an alkylene oxide. Other alkylene oxides may also be used, in particular propylene oxide.

The molecular weight is kept within the limit which is an essential feature of the invention either by including suitable quantities of monofunctional starting materials in the reaction mixture or by breaking off the polycondensation reaction before the molecular weight limit has been exceeded. The equivalent ratio of a) carboxyl groups which may already be partly in the esterified form in the case of transesterification reactions to b) hydroxyl groups which may already be partly in the esterified form in the case of transesterification reactions together with amino groups which may be present is generally between 0.5:1 and 1.5:1 in the preparation of the polyesters or polyester amides. The equivalent ratio of hydroxyl groups, which may already be partly in the esterified form in the case of transesterification reactions, to amino groups is generally between 1:0 and 1:0.5.

The polyesters may be prepared in one stage or in two stages. A two-stage reaction is preferably carried out by reacting a hydroxyl polyester having an acid number below 15 with acid anhydrides of the kind mentioned as examples, for the purpose of incorporating additional carboxyl groups.

The essential condition according to the invention, that the polyesters used as polymer precursors should have a softening point above about 40° C., can easily be achieved by suitable choice of the starting materials. The use of higher than difunctional starting materials resulting in branching of the polyester and the use of aromatic or hydroaromatic starting materials usually result in an increase in the softening point or range.

Polyurethanes and polyurethane polyureas constitute the second important group, after polyesters, of polymer precursors which may be used in the process according to the invention. These polymer precursors with urethane groups, i.e., prepolymers, which are suitable for the process according to the invention are synthesized in known manner from the known starting components of polyurethane chemistry, preferably polyester polyols and/or polyhydroxyl polyethers and/or low molecular weight polyols and the usual polyisocyanates, with the optional addition of difunctional "chain lengthening agents". It should be particularly mentioned that trifunctional and polyfunctional reactants may advantageously be used in addition to monofunctional components to produce branched prepolymers or effect chain breaking if required.

Suitable polyester polyols include, for example, those which have a molecular weight range of 350 to 4,000, preferably 370 to 2,000, which can be obtained in known manner by the reaction of dicarboxylic acids of the kind already mentioned above as examples with excess quantities of polyhydric alcohols also already mentioned above.

Suitable polyether polyols include the known alkoxylation products within a molecular weight range of 400 to 4,000, preferably 400 to 2,000, which can be obtained by addition reactions, preferably of ethylene oxide and/or propylene oxide, to polyhydric starter molecules such as water, ammonia, amines having at least two NH bonds or the low molecular weight polyols already mentioned above as examples.

Suitable low molecular weight polyols include, in particular, those within a molecular weight range of 62 to 400, e.g., those already mentioned above as examples or also lower polyether polyols such as diethylene glycol, tripropylene glycol or diethylene glycol.

Suitable chain lengthening agents, apart from the low molecular weight dihydric alcohols just mentioned above, include, in particular, simple diamines such as hexamethylene diamine or 1-amino,3,3,5-trimethyl-5-aminomethyl-cyclohexane.

The polyisocyanates which may be used include any of the polyisocyanates of polyurethane chemistry, for example, those described in U.S. Pat. No. 3,756,992, column 6, line 45 to column 7, line 19, but the diisocyanates preferred in polyurethane chemistry are preferably used, e.g., 2,4- and/or 2,6-diisocyanatotoluene, 4,4'-diisocyanatodiphenyl methane, hexamethylene diisocyanate or 1-isocyanato-3,3,5-trimethyl-5-isocyanatomethylcyclohexane.

Preparation of the polyurethanes used as polymer precursors in the process according to the invention may be carried out in known manner by the one-shot process or on the principle of the prepolymer process, preferably using the reactants in such proportions, as already mentioned above, that the equivalent ratio of isocyanate groups to active hydrogen atoms is less than 1 and preferably less than 0.9.

The comments given above in the description of the polyesters with regard to their hydrophilic group content and the reactive centers also apply to the polyurethanes and oligourethanes described here.

Introduction of the ionic groups or groups capable of conversion ionic groups into the oligourethanes used as polymer precursors is carried out in known manner by means of compounds which, in addition to isocyanate or preferably groups which are reactive with isocyanate groups, contain ionic groups or groups capable of conversion into ionic groups, for example as described in detail in U.S. Pat. No. 3,756,992 incorporated herein by reference.

The ethylene oxide units preferably contained in the oligourethanes to be used according to the invention are preferably introduced by using diols having polyalkylene oxide side chains according to German Offenlegungsschrift No. 2,314,512 and/or diisocyanates having polyalkylene oxide side chains according to German Offenlegungsschrift 2,314,513 in the synthesis of the prepolymers. However, it should be added to the information given in the said prior publications that, instead of the diols or diisocyanates with side chain polyethylene oxide units described there, it is also possible to use diols or diisocyanates in which the polyalkylene oxide side chain contains other alkylene oxide units in addition to polyethylene oxide units, in particular propylene oxide units. The only important condition to observe is that the quantity of ethylene oxide units should be at least sufficient to result in a prepolymer which contains the proportion of ethylene oxide units indicated above. The particularly preferred non-ionic hydrophilic components which may be included in the reaction mixture used in the process according to the invention have the formula

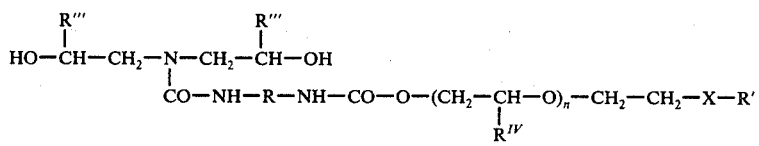

in which
R — represents a divalent group which can be obtained by removal of the isocyanate groups from a diisocyanate having a molecular weight of from 112 to 1,000,
X — represents oxygen or the group —NR″—,
R′ and R″ which may be the same or different, represent monovalent hydrocarbon groups having from 1 to 12 carbon atoms,
R‴ — represents hydrogen or a monovalent hydrocarbon group having from 1 to 8 carbon atoms,
n — represents an integer of from 4 to 89 and
$R^{IV}$ represents hydrogen or, in accordance with the comments given above, it may also partly represent a methyl group.

Another method of introducing ethylene glycol ether segments consists of adding dihydroxy or polyhydroxy polyethers carrying a corresponding number of such segments or triethylene or tetraethylene glycol.

The oligourethanes used according to the invention are synthesized by methods known in the art, for example, by the methods according to U.S. Pat. No. 3,756,992. The starting components mentioned in the said Patent may be used but, in addition to or instead of the starting components with ionic groups or groups capable of conversion into ionic groups mentioned in the said Patent, the last mentioned components having non-ionic hydrophilic segments are added. It is essential to the process according to the invention that the oligourethane which is free from isocyanate groups should be solid at room temperature. This can be achieved, for example, by using mainly low molecular weight starting components for the synthesis of the oligourethanes so that the oligourethanes obtained have a high concentration of urethane and/or urea groups which are capable of forming hydrogen bridges. The addition of higher than difunctional starting components, which make it possible for the oligourethane molecule to undergo branching, also help to ensure that the oligourethanes are solid at room temperature.

The reactive centers essential to the invention, which make it possible for the product to be cross-linked by atmospheric oxygen or by heat, can easily be incorporated during synthesis of the oligourethanes by including unsaturated starting components of the kind already mentioned as examples in the description of the polyesters, by including starting components which in addition to mercapto groups contains groups with active hydrogen atoms, in particular hydroxyl groups or amino groups which are more reactive than sulphhydryl groups in their reaction with isocyanate groups, or by including partially blocked polyisocyanates, i.e., reaction products of the diisocyanates mentioned above as examples with blocking agents such as diethylmalonate, ethyl acetoacetate, ε-caprolactam or phenol, using 1 mol of monofunctional blocking agent per mol of diisocyanate; or lastly, by preparing the partially blocked diisocyanates in situ by using blocking agents such as ε-caprolactam when preparing the oligourethanes.

The mercapto groups, which do not take part in the isocyanate addition reaction during synthesis of the oligourethanes on account of their slowness to react with isocyanate groups, do not enter into the ratio of isocyanate groups to active hydrogen atoms indicated above any more than the carboxylic or sulphonic acid groups which may be present as potential salt groups.

In addition to the starting materials indicated above for the preparation of the polymer precursors with urethane groups to be used according to the invention, monofunctional starting components may also be used, i.e., in particular monoisocyanates such as phenyl isocyanate or n-hexyl isocyanate and monohydric alcohols of the kind already mentioned as examples in the description of the polyesters. The molecular weight of the oligourethane can easily be adjusted in known manner by using suitable starting components in suitable proportions. Thus, for example, the formation of high molecular weight polyurethane in the isocyanate polyaddition reaction can be prevented by using a large excess of isocyanate groups (preparation of isocyanate prepolymers which are subsequently blocked with monofunctional compounds which are reactive with isocyanate groups) or by using an excess of isocyanate groups over groups wich are reactive with isocyanate groups. The formation of polyurethanes having too high a molecular weight can also be prevented by adding monofunctional starting components at the very beginning of the isocyanate polyaddition reaction.

To carry out the process according to the invention, the solid polymer precursor should be in the form of a block, in smaller pieces or as a powder. The substance may be size reduced mechanically in a mill, optionally using auxiliary agents which promote hardening such as dry ice or substances such as silicones or aerosils which prevent the solid pieces from sticking together. However, the substance need not be reduced to a powder for carrying out the process of the invention since large lumps of oligourethanes undergo spontaneous dispersion when introduced into water or when water is poured over them.

The process according to the invention is extremely simple to carry out. For example, the quantity of water required for dispersion is introduced into the reaction vessel and the solid polymer precursor, for example, in the form of a granulate or also in larger pieces or as a coarse powder, is added with gentle stirring. Alternatively, the lumps or powder of polymer precursor may be introduced into the reaction vessel and the required quantity of water may then be poured over it, and the mixture may be stirred to effect more rapid dispersion. The ratio of weight of precursor to water is generally between about 65:35 and 5:95, preferably between about 55:45 and 20:80. Stirring is not necessary. Dispersion can be achieved without shearing forces although the time required is then longer. If no stirrer apparatus is used, it is advisable to agitate the mixture from time to time or to stir it more vigorously by hand for short periods.

The temperature during the dispersion process should be below the softening point of the solid prepolymer so that the precursor will not coagulate to large lumps. However, if the polymer precursor is one containing ionic groups, the temperature may be raised towards the end of the dispersion process so that the substance will dissolve more rapidly.

It is essential to the process according to the invention that water should always constitute the continuous phase during the dispersion process. Only then can the solid substance easily dissolve to form a dispersion below its softening point.

During this process of "dissolving", the lumps of solid material may be stirred if desired, water always forming the continuous phase.

Depending on the melting point of the prepolymer, the process of dispersion may be carried out at temperatures of from about 1° to 150° C., preferably about 20° to 70° C., most preferably at room temperature. It is generally carried out at a temperature below the melting point of the solid.

Emulsifiers may be used to assist the process of dispersion but are not essential. Small quantities of solvents may also be used.

The resulting dispersions of polymer precursors may be used for forming films and coatings on any substrates, for example, they may be used for dressing leather or for coating various materials, including textiles, and in this capacity they may be used as top coats, for example. The dispersions also have important applications as adhesives or lacquers. They may also be used, e.g., as glass fiber sizes, dispersing agents and impregnating agents for fibers and textiles. The products may also be regarded as additives for plastic dispersions or as binders, e.g., for cork powder or sawdust, glass fibers, asbestos, paper-like materials, plastics, or rubber waste and ceramic materials.

If the dispersions contain mercapto groups or olefinic double bonds, the sheets or coats produced from them are hardened by atmospheric oxygen even at room temperature in the presence of the usual siccatives. However, this hardening process can be accelerated by heating the sheets, for example, to temperatures of up to about 180° C. Polymer precursors which contain blocked isocyanate groups as cross-linking centers are processed according to the invention into stoving lacquers which undergo spontaneous cross-linking in the heat and are intended to be applied as aqueous dispersions to heat resistant substrates. The stoving process required for this cross-linking generally takes place at temperature of about 90° to 220° C. for about 2 to 20 minutes.

In addition to being cross-linked according to the invention, the polymer precursors may, of course, also be crosslinked with the aid of cross-linking agents such as formaldehyde or melamine resins according to Patent Application P 25 43 091.5 or U.S. Patent Application Ser. No. 727,088, filed Sept. 27, 1976 by the same inventors as in the instant case.

Among the most preferred polymer precursors suitable for the process of the invention are those which
a. contain urethane groups,
b. have a molecular weight of below 20,000, preferably between about 700 and 10,000,
c. have a softening point of at least about 40° C., preferably of at least 60° C.,
d. contain about 4 to about 180 milliequivalents per 100 g, preferably 4 to 50 milliequivalents per 100 g of ionic groups and/or groups capable of conversion into ionic groups,
e. contain about 0 to 20 preferably about 2 to 17% by weight based on the weight of oligomer of ethylene oxide units which are part of polyether segments,
f. contain 0,2 to 3, preferably 0,5 to 1,5 cross-linking sites per 1000 molecular weight units selected from the group consisting of
  i) olefinic double bonds reactive with atmospheric oxygen,
  ii) sulphhydryl groups, and
  iii) blocked isocyanate groups which liberate free isocyanate groups at elevated temperatures.

The preferred cross-linking sites mentioned under f) are olefinic double bonds reactive with atmospheric oxygen. These polymer precursors containing urethane groups of the invention are prepared in accordance with the methods mentioned hereinbefore. The preferred polymer precursors contain at least two cross-linking sites per molecule or, in the case of olefinic double bonds, at least one such cross-linking site.

EXAMPLE 1

Reaction mixture 292.4 g of a polypropylene oxide ether (hydroxyl number 197) (PAA) started on bisphenol A 95.4 g of a propoxylated adduct of 2-butenediol-(1,4) and sodium bisulphite (hydroxyl number 264, 76.2% in toluene) (AD)

172.5 g of hexamethylene diisocyanate-(1,6) (H)

90.0 g of mercaptoaniline.

Method

The polyether (PAA) and adduct (AD) are dehydrated. The diisocyanate (H) is added at 60° C. The reaction mixture is stirred at 70° C. until the isocyanate content is 5.3%. Mercaptoaniline is added at 70° C. under an atmosphere of nitrogen. The temperature rises exothermally to 100° C. The melt is stirred at 100° C. until it is free of isocyanate groups. At 90° C., the melt is poured out on a plate, and when cooled, it is pulverized mechanically. The solid substance has a melting range of about 40° to 60° C. The average molecular weight is calculated to be 1745. The solid oligourethane contains 27.2 milliequivalents of sulphite groups per 100 g. The solid substance contains 1.15 S-H groups per 1000 molecular weight units. 30 g of the size reduced solid are introduced into 90 g of water at room temperature with slow stirring. A homogeneous 25% dispersion is obtained after 2 hours' stirring at room temperature. The films obtained from this dispersion after drying overnight at room temperature or at 140° C. (15 minutes) are elastic and have tensile strengths of approximately 20 kp/cm$^2$.

EXAMPLE 2

Reaction mixture 342 g of a polypropylene oxide ether (hydroxyl number 197) (PAA) started on bisphenol A 109 g of a propoxylated adduct of 2-butenediol-(1,4) and sodium bisulphite (hydroxyl number 257, 80% in toluene) (AD)

201.6 g of hexamethylene diisocyanate-(1,6)

62.4 g of 2-hydroxyethylmercaptan.

Method: (See Example 1.)

The solid substance melts within the range of 75° to 90° C. Its average molecular weight is calculated to be 1733. The solid oligourethane contains 28.9 milliequivalents of sulphite groups per 100 g of solid.

The product contains 1.15 S-H groups per 1000 molecular weight units.

80 g of water are poured over 30 g of the size reduced product in a glass beaker and the mixture is gently stirred. A finely divided, homogeneous dispersion having a Ford cup outflow time (4 mm nozzle) of 14 seconds at a solids content of 28.0% by weight is obtained after 2 hours' stirring. A film of this dispersion drawn on a glass plate dries after 12 hours' storage at room temperature to form a clear, yellowish film which is insoluble in acetone.

EXAMPLE 3

Reaction mixture 342 g of a polypropylene oxide ether (hydroxyl number 197) (PAA) started on bisphenol A 113 g of a propoxylated 2-butendiol-(1,4) partially reacted with sodium bisulphite (hydroxyl number 263; iodine number 7.0; 80° in toluene) (AD)

5.4 g of trimethylolpropane 175.4 g of hexamethylenediisocyanate 27.1 g of 2-hydroxyethylmercaptan.

Method: (See Example 1.)

The solid had a melting range of 80°–95° C. Its average molecular weight is calculated to be 3690. The solid oligourethane contains 29.7 milliequivalents of sulphite groups per 100 g of solid. The S-H group content is 0.543 per 1000 molecular weight units.

30 g of the size reduced product are introduced into 50 g of water at room temperature and stirred over a period of 2 hours to form a finely divided dispersion. The dispersion has a Ford cup outflow time (4 mm nozzle) of 21 seconds at a solid content of 40.5% by weight. The pH of the dispersion is 5.1.

Heat treatment of the film results in a yellowish, very hard, lacquer-like, clear and firmly adhering sheet.

An analogous solid substance containing 24.5 milliequivalents of sulphite groups per 100 g of solid is also readily dispersible in water. Its average molecular weight is 3704. A dispersion having a solids content of 31% has a Ford cup outflow time (4 mm nozzle) of 21 seconds. The heat treated film is practically identical to the one described above but its resistance to water is slightly higher.

EXAMPLE 4

Reaction mixture 108.8 g of a propoxylated adduct of 2-butenediol-(1,4) and sodium bisulphite (hydroxyl number 197, 80% in toluene) (AD)

458 g of a polyester of butanediol, adipic acid and maleic acid anhydride (hydroxyl number 97.5, iodine number 22) (PE)

151.2 g of hexamethylenediisocyanate-(1,6) (H)

36 g of urea.

Method:

The adduct (AD) is freed from toluene under a vacuum at 100° C. and then cooled to 80° C. The ester (PE) is stirred in at 80° C. under an atmosphere of nitrogen. The subsequent reaction steps are also carried out under an atmosphere of nitrogen. The diol component and diisocyanate (H) are stirred together at 80° C. until the isocyanate content is 3.1%. The reaction is exothermic and causes the temperature to rise to 100° C. Urea is then added to the reaction mixture and the temperature is raised to 130° C. The reaction mixture is stirred until free from isocyanate groups. It is then poured hot on a plate. When cold, it can be size reduced.

The solid substance has a melting range of 105° to 130° C. The average molecular weight is calculated to be 2440. The solid oligourethane contains 27.3 milliequivalents of sulphate groups per 100 g of solid. It contains 0.542 olefinically unsaturated double bonds per 1000 molecular weight units.

100 ml of cold water are poured over 30 g of the size reduced solid and the mixture is stirred at room temperature for one hour, using a magnetic stirrer. A 26.5% by weight dispersion is obtained. This dispersion has a Ford cup outflow time (4 mm nozzle) of 14.8 seconds. After the addition of 2% by weight of cobalt naphthenate (based on the solid content) the dispersion is poured out on glass plates to form films which dry overnight at room temperature to form clear, hard coatings.

EXAMPLE 5

Reaction mixture 342 g of a polypropylene oxide ether (hydroxyl number 197) (PAA) started on bisphenol A 113 g of a propoxylated 2-butenediol-(1,4), partially sodium bisulphite (hydroxyl number 263; iodine number 7.0; 80% in toluene) (AD)

5.4 g of trimethylolpropane (TMP)

175.4 g of hexamethylenediisocyanate-(1,6) (H)

39.2 g of ε-caprolactam

Method

The polyether (PAA), reaction product (AD) and TMP are dehydrated in a vacuum at 110° C. with stirring. When the reaction mixture has cooled to 70° C., the diisocyanate (H) is added and the mixture heated to 100° C. until its isocyanate content is 2.4%. ε-Caprolactam is then added and the mixture heated to 95°–100° C. until no more isocyanate groups can be detected, 2 drops of tin octoate being added towards the end of the reaction. The hot melt is then poured out on a plate and size reduced when cooled.

The solid has a melting range of 85° to 95° C. Its average molecular weight is 3760. The solid oligourethane contains 29.1 milliequivalents of sulphite groups per 100 g of solid. It contains 0.532 masked isocyanate groups per 1000 molecular weight units. When 75 ml of water have been poured over 30 g of the size reduced products at room temperature, the mixture can be stirred at room temperature by means of a magnetic stirrer to form a dispersion which is resistant to centrifuging and shows a Tyndall effect in transmitted light. The Ford cup outflow time (4 mm nozzle) is 17 seconds for a dispersion having a solid content of 30.4%. The pH is 5.4.

When the film formed from this dispersion is heated at about 160° C., a hard, clear, yellowish, almost scratch resistant coating is obtained. The hardness is not improved by the addition of amines.

EXAMPLE 6

Reaction mixture 285 g of a polypropylene oxide ether (hydroxyl number 197) (PAA) started on bisphenol A,
32 g of N-methyl-diethanolamine (MDA)
193.8 g of hexamethylene diisocyanate-(1,6) (H)
32 g of dimethylsulphate (DMS)
73.2 g of $\ominus$-caprolactam.

Method

The polyether (PAA) is dehydrated. MDA is added when the polyether has cooled to 80° C. After 10 minutes' stirring at 80° C., the diisocyanate (H) is added and stirring is continued at 90° C. until the isocyanate content is 5.1%. The mixture is then cooled to 65° C. and DMS is stirred in. ε-Caprolactam is then added and the mixture is stirred at 75° C. until no more isocyanate groups can be detected. The hot melt is then poured out on a plate and size reduced when cooled.

The solid has a melting range of 65° to 75° C. but is somewhat tacky. Its average molecular weight is calculated to be 1904. The solid oligourethane contains 42.4 milliequivalents of cationic groups per 100 g of solid content. It contains 1.05 masked isocyanate groups per 1000 molecular weight units.

When 70 ml of water are poured over 30 g of the size reduced product, the mixture can be stirred to form a sedimentation resistant dispersion within 30 minutes. The dispersion has a viscosity of 200 cP (25.3% solid content). This viscosity increases to about 6000 cP after 2 days. The pH is 6.3.

The film obtained after heat treatment of this dispersion is clear but somewhat softer than that obtained in Examples 3 and 5.

EXAMPLE 7

Reaction mixture 285.0 g of a polypropylene oxide ether (hydroxyl number 197) (PPA) started on a bisphenol A
33.5 g of dimethylolpropionic acid (DMPS)
151.2 of hexamethylene diisocyanate-(1,6) (H)
33.3 g of ε-caprolactam
22.2 g of N,N'-dimethylaminoethanol.

Method

The polyether (PPA) is dehydrated in a water jet vacuum at 120° C. with stirring for 30 minutes and then cooled to 80° C. DMPS is stirred in at 80° C. to form a homogeneous mixture. The diisocyanate (H) is then added at 70° C. and stirred until the isocyanate content is 2.65%. ε-Caprolactam is then added and the melt stirred until free from isocyanate groups, the temperature being raised to 120° to 130° C. at this stage. When no more isocyanate groups can be detected, N,N'-dimethylaminoethanol is stirred in and stirring is continued for 20 minutes. The hot melt is then poured on a plate and left to cool at room temperature. The solid substance is then size reduced mechanically. It has a melting range of 100° to 110° C. Its average molecular weight is calculated to be 3564. The solid oligourethane contains 47.5 milliequivalents of $CO_2^\ominus$ groups per 100 g of solid content. It contains 0.56 blocked isocyanate groups per 1000 molecular weight units.

When 70 g of water are poured over 30 g of the size reduced solid, the solid can be dispersed within one hour at room temperature with the aid of a magnetic stirrer to form a dispersion which shows a Tyndall effect is transmitted light. The dispersion has a solid content of 31.2%, a viscosity of 2000 cP and a pH of 6.6. When a film of this dispersion is tried at 180° C. for 10 minutes, clear, hard, firmly adhering coating having the character of a lacquer is obtained.

EXAMPLE 8

Reaction mixture 285 g of a polypropylene oxide ether (hydroxyl number 197) (PAA) started on bisphenol A
35 g of dispersing agent A
25 g of dimethylolpropionic acid (DMPS)
153.4 g of hexamethylene diisocyanate-(1,6)
47.6 g of ε-caprolactam.

Dispersing agent A

N,N-Diethanolamine is chemically added to the reaction product of a polyethylene oxide polyether which has been started on butanol and contains about 17% of polypropylene oxide groups and hexamethylene diisocyanate-(1,6) (NCO/OH of reaction product = 2:1) (NCO/NH of addition product = 1.1). The molecular weight is 2250. The ethylene oxide content is approximately 77% by weight.

Method:

The polyether PAA, dispersing agent A and DMPS are dehydrated and the diisocyanate is added at 60° C. The reaction mixture is stirred at 70° C. until the isocyanate content is constant. ε-caprolactam is then added at 70° C. The melt is stirred at 100° C. until it is free from isocyanate groups. At 90° C. the melt is poured on a steel plate, cooled to room temperature and subsequently pulverized mechanically.

The solid substance melts within a range of 85°–95° C. Its average molecular weight is calculated to be 2592. The solid oligourethane contains 34.1 milliequivalents of $CO_2^\ominus$ groups per 100 g of solid substance. The content in $CH_2$—$CH_2$—O units is 4.9%. The substance contains 0.77 blocked isocyanate groups per 1000 molecular weight units.

The size reduced product is readily dispersed in water. When 100 g of the solid substance is stirred into 210 g of water containing 4.6 g of 25% ammonia at room temperature in a glass beaker, using a magnetic stirrer, a finely divided dispersion which shows the Tyndall effect in transmitted light is obtained. The dispersion having a solid content of 25.7% has a Ford cup outflow time (4 mm nozzle) of 20 seconds and a pH of 8.4. When a film of this dispersion is dried at 180° C. for 10 minutes, a hard, clear film which adheres firmly to glass is obtained.

EXAMPLE 9

Reaction mixture 342.0 g of a polypropylene oxide ether (hydroxyl number 197) (PAA) started on bisphenol A
35.7 g of N-methyldiethanolamine (N-MDA)
181.5 g of hexamethylene diisocyanate-(1,6) (H)
35.7 g of dimethylsulphate (DMS)
40.6 g of ε-caprolactam.

Method

The polyether (PPA) is dehydrated in a water jet vacuum at 120° C. for 30 minutes with stirring and then cooled to 40° C. The tertiary amine (N-MDA) is added. The mixture is stirred for 10 minutes. The diisocyanate (H) is then added at 40° C. The mixture is stirred at a temperature of 50° to 60° C. until the isocyanate content is 2.7%. DMS is then added at this temperature and, after a further 2 minutes, ε-caprolactam. The melt is then stirred until free from isocyanate, 3 drops of tin octoate being added as catalyst during the last phase. During this phase, the melt is heated to 120° C. It is then poured at this temperature on a plate and cooled to room temperature. The product is then mechanically size reduced. The oligourethane melts within a range of 100° to 110° C. Its average molecular weight is calculated to be 3538. The solid substance contains 44.5 milliequivalents of cationic groups per 100 g of solid. It also contains 0.45 blocked isocyanate groups per 1000 molecular weight units.

The size reduced product can be dispersed in water within 4 hours if 30 g of the solid substance is introduced into 100 ml of water at room temperature and slowly stirred on a magnetic stirrer. The dispersion having a solid content of 23.5% has a Ford cup outflow time (4 mm nozzle) of 24 seconds and a pH of 5.6. A film of the dispersion heated to 180° C. for 10 minutes becomes hard and clear and shows very good properties of adhering to glass.

EXAMPLE 10

Reaction mixture 118.6 g of propanediol-(1,2) (P)
80.4 g of trimethylolpropane (TMP)
23.7 g of adipic acid (A)
121.9 g of isophthalic acid (I)
70.2 g of maleic acid anhydride (MSA)
46.8 g of tetrahydrophthalic acid anhydride (THPA).

Method

The alcohols (P), (TMP) and acids (A), (I), (MSA) and (THPA) are stirred at 220° C. under an atmosphere of nitrogen with removal of water by distillation (about 12 hours) until a clear, yellow brown melt is obtained. The hot melt is poured out on a plate and cooled to room temperature.

The solid product softens within a range of 70° to 85° C. It has an acid number of 70.7 and a hydroxyl number of 181.5, from which the molecular weight is calculated to be about 1000. The solid substance contains 2.22 double bonds per 1000 molecular weight units.

30 g of the size reduced solid substance are introduced into 125 ml of water containing 3.04 g of N,N-dimethylaminomethanol under an atmosphere of nitrogen with slow stirring and dispersed within about 3 hours at room temperature. The dispersion has a solids content of 21% and a Ford cup outflow time (4 mm nozzle) of 14 seconds. Its pH is 8. The solid substance contains 113 milliequivalents of $CO_2^{\ominus}$ groups per 100 g of solid.

2% of cobalt naphthaenate (based on the quantity of dispersion) is added as siccative. The film subsequently drawn out from the dispersion becomes hard and clear after heat treatment (10 minutes, 140° C.).

EXAMPLE 11

Reaction mixture 372.4 g of a polyester of butanediol, phthalic acid and maleic acid anhydride (hydroxyl number 115.6; acid number 4.9; iodine number 36.3) (PE)
98.8 g of propoxylated 2-butanediol-(1,4) partially reacted with sodium bisulphite (hydroxyl number 263; iodine number 7.0; 80% in toluene) (AD)
127.8 g of hexamethylene diisocyanate-(1,6) (H)
39.7 g of ε-caprolactam.

Method

The adduct (AD) is freed from toluene under a vacuum at 110° C. and then cooled to 80° C. The ester (PE) is stirred in at 80° C. under an atmosphere of nitrogen. The subsequent reaction steps are also carried out under an atmosphere of nitrogen. The diisocyanate (H) is then added, also at 80° C., and the reaction mixture is stirred at 100° C. until its isocyanate content is 2.7% (about 40 minutes). ε-Caprolactam is then added and the mixture stirred at 100° to 130° C. until no more isocyanate groups can be detected. The hot melt is then poured out on a plate and cooled to room temperature.

The solid substance melts within a range of 80° to 100° C. It contains 0.88 ε=ε double bonds and 0.57 masked isocyanate groups per 1000 molecular weight units. The average molecular weight is calculated to be 3526. The solid substance contains 26.9 milliequivalents of $SO_3^{\ominus}$ groups per 100 g of solid.

30 g of the size reduced solid are introduced into 90 ml of water at room temperature under an atmosphere of nitrogen with slow stirring on a magnetic stirrer and dispersed within 30 minutes. The 23.8% aqueous dispersion obtained has a Ford cup viscosity (4 mm nozzle) of 13 seconds and a pH of 4.

When 2% of cobalt naphthenate (based on the solid content) are added to the dispersion which is then drawn out to form films on a glass plate and the films are heated to 190° C. for 10 minutes, clear, hard coatings are obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of self cross-linking films from aqueous dispersions comprising
   1. preparing a polyester or polyurethane oligomer which
      a. has a number average molecular weight below about 20,000,
      b. has a softening point of at least about 40° C.,
      c. contains hydrophilic groups selected from the group consisting of:
         i. about 4 to 180 milliequivalents per 100 g of oligomer of ionic groups and groups capable of conversion to ionic groups, ii. about 2 to 20 weight percent, based on the weight of oligomer of ethylene oxide units of the formula —CH$_2$—CH$_2$—O— and iii. mixtures of i) and ii), and
d. contains cross-linking sites selected from the group consisting of:
 i. olefinic double bonds reactive with atmospheric oxygen,
 ii. sulphhydryl groups and
 iii. blocked isocyanate groups which liberate free isocyanate groups at elevated temperatures,
2. combining said oligomer in the form of lumps or coarse powders with water to form a storage stable dispersion with the conversion of those potential ionic groups to ionic groups in a known manner which are necessary to assure a stable dispersion before, during or after the combination with water,
3. applying the dispersion to a substrate to form a film and
4. drying and cross-linking the film so formed through the action of heat and/or siccatives.

2. The process of claim 1 wherein
 1. the oligomer has a number average molecular weight of between about 700 and 10,000 and contains between about 0.2 and 3 cross-linking sites per 1,000 molecular weight units and at least two sites per molecule of type ii) or iii) and at least one per molecule if a olefinic double bond,
 2. the potential ionic groups whose conversion to ionic groups is needed to form a stable dispersion are converted at the same time that the lump or coarse powder form oligomer is combined with the water and
 3. the ratio by weight of oligomer to water is between about 65:35 and 5:95.

3. The process of claim 1, wherein
 1. the oligomer contains between about 0.5 and 1.5 olefinic double bonds per 1,000 molecular weight units and at least one double bond per molecule and
 2. the cross-linking of the film is enhanced by the addition of between about 0.05 and 5 weight percent of siccatives, based on the weight of oligomer.

4. The process of claim 1, wherein the oligomer is a polyurethane having a number average molecular weight of between about 700 and 10,000 containing
 1. about 4 to 50 milliequivalents of ionic and potential ionic groups,
 2. about 0 to 17 weight percent of ethylene oxide units of the formula —CH$_2$—CH$_2$—O— and
 3. about 0.5 to 1.5 cross-linking sites per 1,000 molecular weight units.

5. The process of claim 1, wherein the oligomer is a polyurethane having a number average molecular weight of between about 700 and 1,000 containing
 1. about 20 to 150 milliequivalents of ionic groups and potential ionic groups and
 2. about 0.5 to 1.5 cross-linking sites per 1,000 molcular weight units.

6. The process of claim 1, wherein
 1. the oligomer is a polyurethane having a number average molecular weight of between about 700 and 10,000,
 2. the oligomer contains between about 0.5 and 1.5 blocked isocyanate groups per 1,000 molecular weight units and two such groups per molecule and
 3. the film is cross-linked by the action of heat.

7. A process for the production of water dispersable self cross-linking solids comprising
 1. preparing a polyester or polyurethane oligomer which
  a. has a number average molecular weight of below about 20,000,
  b. has a softening point of at least about 40° C.,
  c. contains hydrophilic groups selected from the group consisting of
   i. about 4 to 180 milliequivalents per 100 g of oligomer of ionic groups and groups capable of conversion to ionic groups,
   ii. about 2 to 20 weight percent, based on the weight of oligomer, of ethylene oxide units of the formula —CH$_2$—CH$_2$—O— and
   iii. mixtures of i) and ii), and
  d. contains about 0.2 to 3 cross-linking sites per 1,000 molecular weight units selected from the group consisting of
   i. olefinic double bonds reactive with atmospheric oxygen,
   ii. sulphhydryl groups, and
   iii. blocked isocyanate groups which liberate free isocyanate groups at elevated temperatures and
 2. comminuting the oligomer to lumps or coarse powder.

8. The product of the process of claim 7.

9. A solid oligomeric polyurethane precursor which is free from isocyanate groups which
 a. contains urethane groups,
 b. has a number average molecular weight of below about 20,000,
 c. has a softening point of at least about 40° C.,
 d. contains about 4 to 180 milliequivalents per 100 g of oligomer of ionic groups and/or groups capable of conversion to ionic groups,
 e. contains about 0 to 20% by weight, based on the weight of oligomer of ethylene oxide units and
 f. contains about 0.2 to 3 cross-linking sites per 1000 molecular weight units selected from the groups consisting of
  i. olefinic double bonds reactive with atmospheric oxygen,
  ii. sulphhydryl groups, and
  iii. blocked isocyanate groups which liberate free isocyanate groups at elevated temperatures.

10. The oligomeric polymer precursor of claim 9 which
 a. contains urethane groups,
 b. has a number average molecular weight of from about 700 to 10,000,
 c. has a softening point of at least about 60° C.,
 d. contains 4 to 50 milliequivalents per 100 g of oligomer of ionic groups and/or groups capable of conversion to ionic groups,
 e. contains about 2 to 17% by weight based on the weight of oligomer of ethylene oxide units, and
 f. contains about 0.5 to 1.5 cross-linking sites per 1,000 molecular weight units consisting of olefinic double bonds reactive with atmospheric oxygen.

11. A process for the preparation of self cross-linking films from aqueous dispersions comprising
 1. preparing a polyester or polyurethane oligomer which
  a. has a number average molecular weight below about 20,000, b. has a softening point of at least about 40° C.,
c. contains hydrophilic groups selected from the group consisting of:
  i. about 4 to 180 milliequivalents per 100 g of oligomer of ionic groups and groups capable of conversion to ionic groups,
  ii. about 2 to 20 weight percent, based on the weight of oligomer of ethylene oxide units of the formula —CH$_2$—CH$_2$—O— and iii. mixtures of i) and ii), and
d. contains cross-linking sites selected from the group consisting of:
  i. olefinic double bonds reactive with atmospheric oxygen and
  ii. sulphhydryl groups,
2. combining said oligomer in the form of lumps or coarse powders with water to form a storage stable dispersion with the conversion of those potential ionic groups to ionic groups in a known manner which are necessary to assure a stable dispersion before, during or after the combination with water,
3. applying the dispersion to a substrate to form a film and
4. drying and cross-linking the film so formed through the action of heat and/or siccatives.

12. A solid oligomeric polyurethane precursor which is free from isocyanate groups which
a. contains urethane groups,
b. has a number average molecular weight of below about 20,000,
c. has a softening point of at least about 40° C.,
d. contains about 4 to 180 milliequivalents per 100 g of oligomer of ionic groups and/or groups capable of conversion to ionic groups,
e. contains about 0 to 20% by weight, based on the weight of oligomer of ethylene oxide units and
f. contains about 0.2 to 3 cross-linking sites per 1000 molecular weight units selected from the groups consisting of
  i. olefinic double bonds reactive with atmospheric oxygen and
  ii. sulphhydryl groups.

* * * * *